(12) United States Patent
Boening et al.

(10) Patent No.: US 9,752,456 B2
(45) Date of Patent: Sep. 5, 2017

(54) TURBOCHARGER HOUSING HAVING A SEALING DEVICE

(75) Inventors: Ralf Boening, Reiffelbach (DE); Holger Faeth, Fuessgoenheim (DE); Ralph-Maurice Koempel, Mannheim (DE)

(73) Assignee: Continental Automotive GmbH, Hannover (DE)

( * ) Notice: Subject to any disclaimer, the term of this patent is extended or adjusted under 35 U.S.C. 154(b) by 1193 days.

(21) Appl. No.: 13/509,639

(22) PCT Filed: Nov. 4, 2010

(86) PCT No.: PCT/EP2010/066826
§ 371 (c)(1),
(2), (4) Date: May 14, 2012

(87) PCT Pub. No.: WO2011/057945
PCT Pub. Date: May 19, 2011

(65) Prior Publication Data
US 2012/0269620 A1 Oct. 25, 2012

(30) Foreign Application Priority Data
Nov. 13, 2009 (DE) .......................... 10 2009 053 238

(51) Int. Cl.
| F01D 25/24 | (2006.01) |
| F02C 6/12 | (2006.01) |
| F04D 29/42 | (2006.01) |
| F04D 29/08 | (2006.01) |

(52) U.S. Cl.
CPC ............... *F01D 25/24* (2013.01); *F02C 6/12* (2013.01); *F04D 29/083* (2013.01); *F04D 29/4206* (2013.01); *F05D 2230/53* (2013.01); *F05D 2240/55* (2013.01)

(58) Field of Classification Search
CPC ............... F04D 17/125; F04D 29/0563; F05D 2240/14; F16C 2360/24; F02C 6/12; F01D 25/243
USPC ..... 415/170.1, 175, 178, 213.1, 229; 60/597
See application file for complete search history.

(56) References Cited

U.S. PATENT DOCUMENTS

| 4,384,821 | A |   | 5/1983 | Mains et al. |
| 4,541,786 | A | * | 9/1985 | McLean ........................ 417/407 |
| 4,676,515 | A | * | 6/1987 | Cobb ............................ 277/592 |
| 4,704,075 | A | * | 11/1987 | Johnston ............... F01D 25/125 |
| | | | | 417/407 |
| 5,102,305 | A | * | 4/1992 | Bescoby et al. ............... 417/407 |
| 5,322,299 | A | * | 6/1994 | Terai .............................. 277/596 |
| 5,549,449 | A | * | 8/1996 | McInerney et al. .......... 415/177 |
| 6,017,184 | A | * | 1/2000 | Aguilar et al. ............... 415/112 |
| 6,425,743 | B1 |   | 7/2002 | Fischer |

(Continued)

FOREIGN PATENT DOCUMENTS

| CN | 101363329 A | 2/2009 |
| DE | 486737 C | 11/1929 |

(Continued)

*Primary Examiner* — Sean J Younger
(74) *Attorney, Agent, or Firm* — Laurence A. Greenberg; Werner H. Stemer; Ralph E. Locher (57) ABSTRACT

A turbocharger housing is divided along the longitudinal direction into at least two housing halves. The turbocharger housing includes a sealing device between the two housing halves for sealingly connecting the two housing halves.

12 Claims, 5 Drawing Sheets

(56) References Cited

U.S. PATENT DOCUMENTS

| | | | |
|---|---|---|---|
| 6,974,137 B2 * | 12/2005 | Beutter et al. | 277/598 |
| 7,097,432 B1 * | 8/2006 | Lombard | F01D 17/143 415/157 |
| 7,377,519 B2 * | 5/2008 | Beutter et al. | 277/591 |
| 7,621,494 B2 | 11/2009 | Rees et al. | |
| 7,918,215 B2 * | 4/2011 | Martin et al. | 123/559.1 |
| 8,123,470 B2 | 2/2012 | Serres et al. | |
| 2006/0151960 A1 * | 7/2006 | Sadowski | 277/592 |
| 2007/0013148 A1 * | 1/2007 | Blessing et al. | 277/637 |
| 2008/0143060 A1 * | 6/2008 | Casler et al. | 277/654 |
| 2009/0013676 A1 * | 1/2009 | Capelle et al. | 60/320 |
| 2009/0013677 A1 * | 1/2009 | Capelle et al. | 60/320 |

FOREIGN PATENT DOCUMENTS

| | | |
|---|---|---|
| DE | 197 44 330 A1 | 4/1998 |
| DE | 197 58 642 C2 | 7/2002 |
| EP | 1 988 261 A1 | 11/2008 |
| FR | 1078712 A | 11/1954 |
| GB | 775 455 A | 5/1957 |
| JP | 2009281295 A * | 12/2009 |

\* cited by examiner

FIG 6a Section A-A 60　　　　　60

FIG 6b Section B-B 64　　　　　64

— 1 —
TURBOCHARGER HOUSING HAVING A SEALING DEVICE

BACKGROUND OF THE INVENTION

FIELD OF THE INVENTION

The invention relates to a sealing device for a turbocharger housing, wherein the turbocharger housing is divided in the longitudinal direction into at least two housing halves, wherein each of the housing halves comprises a turbine housing, a bearing housing and/or a compressor housing.

Turbochargers are used to improve the efficiency of an internal combustion engine and hence to boost the power output thereof. For this purpose, the turbocharger has a turbine having a turbine wheel and a compressor having a compressor wheel, the two rotor wheels being arranged on a common shaft. The turbine wheel is driven by an exhaust gas mass flow from a connected internal combustion engine and, in turn, drives the compressor wheel. The compressor compresses the induced air and feeds it to the internal combustion engine. The shaft is supported in a bearing housing of the turbocharger. The turbine wheel is furthermore arranged in a turbine housing, and the compressor wheel is arranged in a compressor housing.

As a rule, a turbocharger is made up of a number of individual housings, such as the abovementioned compressor housing, turbine housing and bearing housing. These housings are arranged one behind the other and connected sealingly to one another. In a novel embodiment according to the invention, a turbocharger housing comprising a compressor housing, a bearing housing and/or a turbine housing is divided in the longitudinal direction into at least two housing halves, not in the transverse direction or transversely to the longitudinal axis, as hitherto. These housing halves must then be connected to one another with appropriate sealing.

BRIEF SUMMARY OF THE INVENTION

It is therefore the object of the present invention to provide a sealed turbocharger housing.

This object is achieved by a turbocharger housing having the features as claimed.

Thus, according to the invention, a turbocharger housing is provided which is divided in the longitudinal direction into at least two housing halves, wherein the turbocharger housing has a sealing device between the two housing halves for sealingly connecting the two housing halves.

The turbocharger housing having the sealing device has the advantage that the housing halves can be connected to one another sealingly in a very simple manner by means of the sealing device, making it impossible for any exhaust gas or indeed lubricant etc. to escape accidentally to the outside from the turbocharger housing, for example.

Advantageous embodiments and developments of the invention will emerge from the dependent claims and from the description with reference to the drawings. The invention is explained in greater detail below with reference to the embodiments indicated in the schematic figures of the drawings, in which:

DESCRIPTION OF THE INVENTION

In all the figures, elements and apparatus which are the same or have the same function have been provided with the same reference signs, unless otherwise indicated. Moreover, the depiction of the turbocharger in the following figures is shown in a purely schematic way, which is not to scale and is greatly simplified.

Figure 1:
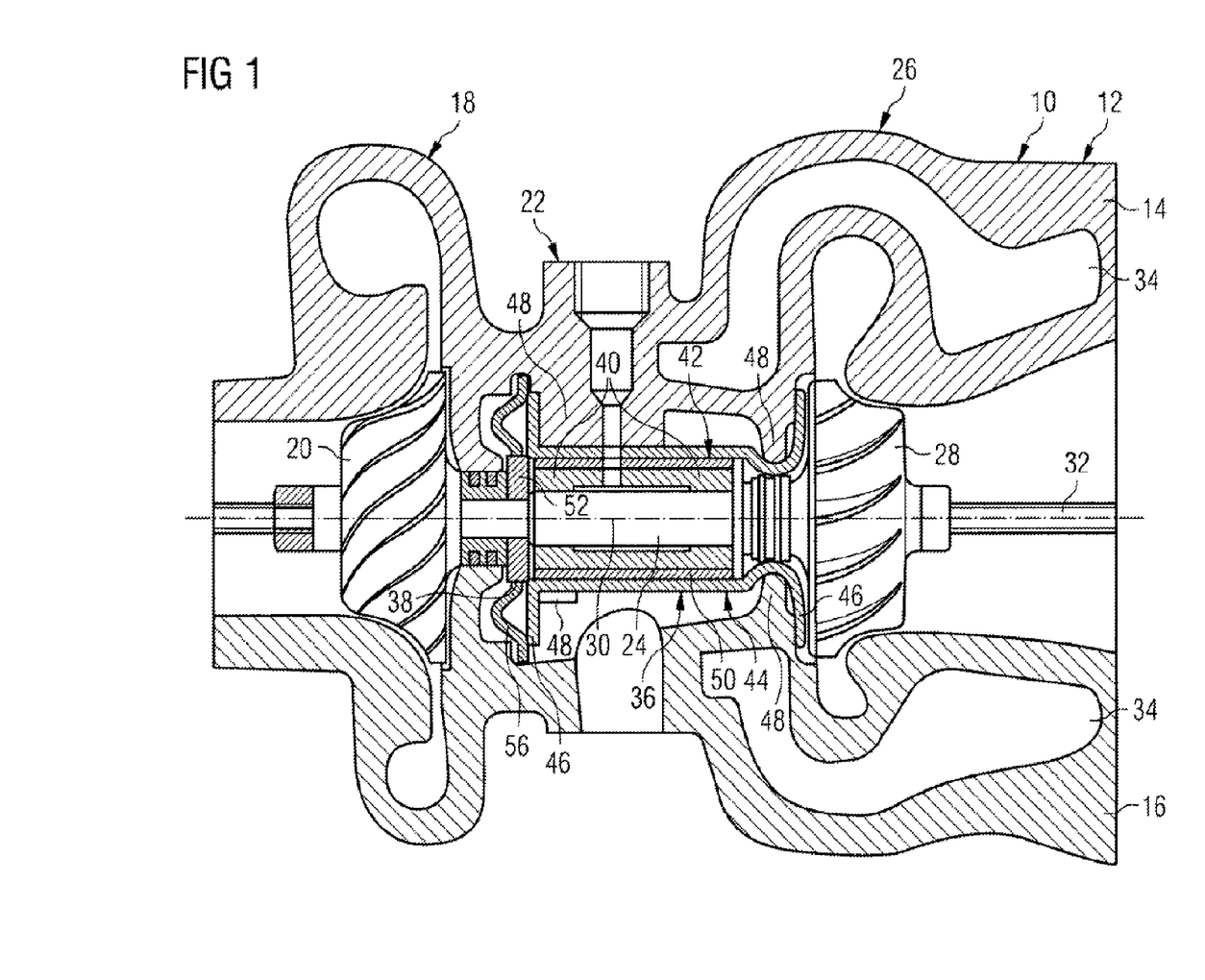
FIG. 1 shows a sectioned view of a turbocharger having a sealing device according to the invention, wherein the turbocharger housing is designed so as to be divided in the longitudinal direction into two housing halves.

FIG. 1 shows a sectioned view through a turbocharger 10, the turbocharger housing 12 of which is designed so as to be divided in the longitudinal direction, into at least two housing halves 14, 16 for example. The turbocharger housing 12 comprises the compressor housing 18, in which the compressor wheel 20 is arranged, the bearing housing 22 for supporting a shaft 24, and the turbine housing 26, in which the turbine wheel 28 is arranged. According to the invention, the compressor housing 18, the bearing housing 22 and/or the turbine housing 26 are combined into a single housing part and designed so as to be divided in the longitudinal direction into at least two housing halves 14, 16.

In the example in FIG. 1, all three housings 18, 22, 26 are combined into a single housing part and divided in the longitudinal direction into two housing halves 14, 16, for example. The division in the longitudinal direction can be performed in the horizontal or a horizontal plane or at some other angle to a horizontal plane, for example. The longitudinal axis 30 of the turbocharger housing 12 can lie in the horizontal plane or parallel to the latter or can intersect the horizontal plane, but does not necessarily do so.

As shown in FIG. 1, the turbine housing 26, the bearing housing 22 and/or the compressor housing 18 can each individually be formed by at least two or more housing halves 14, 16. In the present case, a first housing half 14, comprising the turbine housing 26, the bearing housing 22 and the compressor housing 18, forms the "top part" 14 with a lubricant inlet, and a second housing half (not shown), comprising the turbine housing 26, the bearing housing 22 and the compressor housing 18, forms the "bottom part" 16, which has a lubricant outlet, for example. The two housing halves 14, 16, as shown in FIG. 1, are connected or fastened to one another, e.g. by means of screwing and/or pinning, to name two fastening options. In principle, however, any other means of fastening the two housing halves 14, 16 that is suitable for connecting the two housing halves to one another can be provided.

According to the invention, a sealing device 32 is provided between the two housing halves 14, 16 for sealingly connecting the two housing halves 14, 16. In FIG. 1, the sealing device 32 is merely indicated, and it is explained in greater detail below with reference to FIGS. 2 to 6.

In the example shown in FIG. 1, at least one housing section is furthermore provided with an additional temperature control device, in this case, for example, a temperature control jacket or fluid jacket 34, in which there is a flow of fluid, e.g. water, in order to cool and/or heat the housing section. The temperature control device can be designed to control the temperature of at least part or essentially the whole of the turbine housing 26, the bearing housing 22 and/or the compressor housing 18. The temperature control device or, in FIG. 1, the fluid jacket 34 surrounds the bearing housing section 22 and the turbine housing section 26 of the turbocharger housing 12, for example, doing so without any undercuts, for example. This means that there is no need for a sand core for the production of the fluid jacket 34 to be assembled from several pieces and adhesively bonded, for example. Another advantage is that at least one half of the turbocharger housing 12 can be integrated into an engine block and/or a cylinder head of a connected engine. At the same time, the bottom part 16 of the turbocharger housing 12, for example, can be at least partially or completely integrated into the engine block, and the top part 14 can be at least partially or completely integrated into the cylinder head or vice versa.

In FIG. 1, the shaft 24 on which the turbine wheel 28 and the compressor wheel 20 are provided is supported in the bearing housing section 22 of the turbocharger housing 12. The shaft 24 has a radial bearing arrangement 36 and optionally has an axial bearing arrangement 38 in addition. The radial bearing arrangement 36 and the axial bearing arrangement 38 each form the basis of a separate patent application.

In the example of a radial bearing arrangement 36 shown in FIG. 1, said arrangement has two radial plain bearings 40, for example, which are spaced apart by means of a spacer sleeve 42 and are formed integrally with said spacer sleeve 42, for example, as illustrated in FIG. 1, or are designed as separate parts (not shown). As an option, it is furthermore possible for a sleeve element 44 to be provided in addition, said sleeve element having at the two ends thereof two collar sections 46, by means of which the radial bearing arrangement 36 can be braced axially between two receptacles 48 or offsets or projections of the turbocharger housing 12. One or both collar sections 46 can be of resilient or rigid design and, as an option, can additionally be extended outward out of the oil space, enabling them to perform an additional function, such as that of a heat shield. As an option, an additional layer 50 consisting of one or more component layers of a flexible and heat-resistant or temperature-stable material can additionally be provided on the outside and/or the inside of the sleeve element 44. A polymer, an elastomer and/or hard rubber are examples of such a material, to name just a few examples.

Moreover, at least one axial bearing 52 in the form of an axial bearing washer, for example, can be provided as an axial bearing arrangement 38, and this axial bearing can additionally be designed with a receptacle 54 in such a way that an oil deflector plate 56, for example, can be arranged thereon. The radial bearing arrangement 36 and the axial bearing arrangement 38 in FIG. 1 are merely one example of a bearing assembly for the shaft 24 in the radial and the axial direction. In principle, the shaft 24 can have any other radial bearing arrangement and/or axial bearing arrangement in the turbocharger housing 12, e.g. noncontact bearings, such as magnetic bearings, and/or rolling contact bearings etc.

Figure 2:
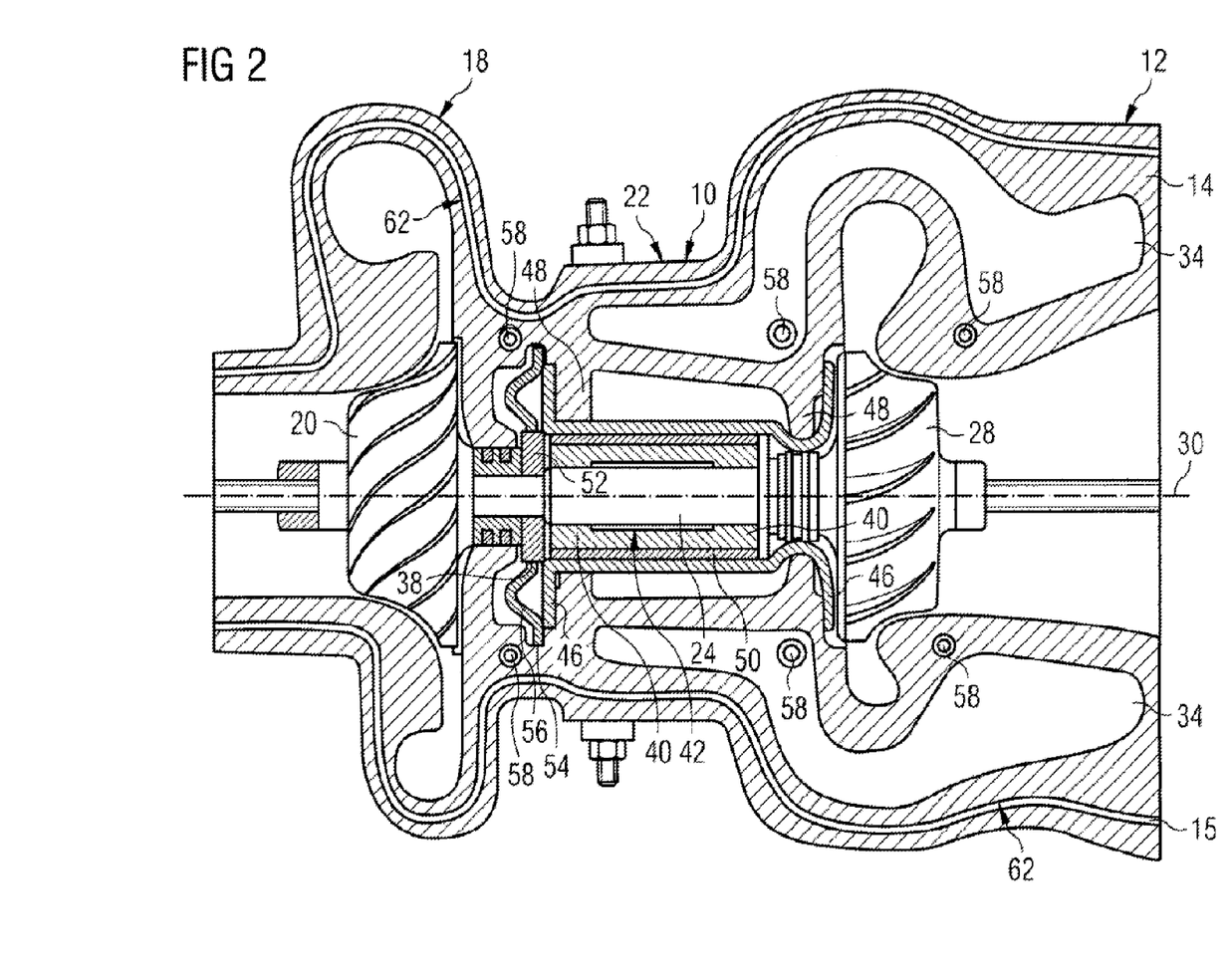
FIG. 2 shows a sectioned view of one housing half of the longitudinally divided turbocharger housing shown in FIG. 1 as seen from the seal side.

FIG. 2 shows another sectioned view of the turbocharger housing shown in FIG. 1, wherein a housing half 14 is shown in section from the seal side. As described above, the two first and second housing halves 14 of the turbocharger housing 12 are fastened to one another after the installation of the shaft 24 together with the bearing arrangement, and the rotor wheels, e.g. by means of screwing and/or pinning. In the example shown in FIG. 2, at least one or more holes 58 are provided for this purpose to enable the two housing halves 14 to be screwed together. The two housing halves 14 are furthermore sealed relative to one another, being provided with a sealing device 32 according to the invention.

According to a first embodiment of the invention, the sealing device 32 has at least one elastomer seal 60 or an O-ring seal for sealing or connecting the two housing halves 14 of the turbocharger housing 12 in an essentially sealed manner. For this purpose, a corresponding seal seat 62, in the form of a depression or groove or recess 15 for example, is provided in at least one or both housing halves. The seal seat 62 can end before one or both ends of the turbocharger housing 12, as shown in FIG. 2, or can run as far as one or both ends of the turbocharger housing 12, as indicated by a dashed line in FIG. 2. At least one elastomer seal 60 is inserted into the seal seat 62 before the two housing halves 14 are fastened to one another.

In the assembled condition, the surfaces of the housing halves make contact with one another without the sealing device, for example, as shown in the following FIG. 3.

Instead of the elastomer seal 60 or O-ring seal or an O-ring which has, as it were, been cut open, forming an O-ring cord, it is also possible to provide a beaded seal (not shown) as a sealing device 32. In this case, it is possible to dispense with a seal seat 60 in the form of a depression or recess 15 of the kind shown in FIG. 2. Instead, the beaded seal 32 can be placed directly between the two planar or level surfaces of the two housing halves 14, as indicated in the following FIG. 4. The beaded seal can be designed in such a way that it extends substantially completely or at least partially over the respective level or planar surface of the associated housing half 14. The beaded seal can be a metal beaded seal, for example, which can be provided at least partially or completely with an additional coating, e.g. a plastic coating and/or rubber coating, the plastic coating and the rubber coating being correspondingly temperature-stable and being suitable for the respective temperature range of the housing where they are mounted.

Figure 3:
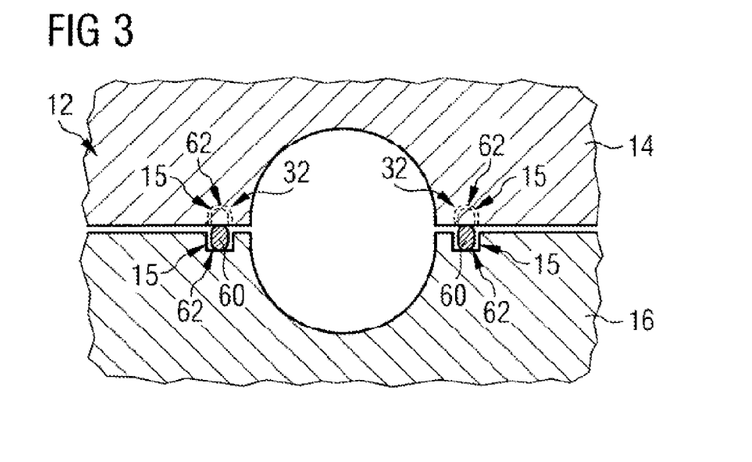
FIG. 3 shows a first embodiment according to the invention of a sealing device for a turbocharger housing.

FIG. 3 shows a greatly simplified sectioned view of both housing halves 14, 16 of a turbocharger housing 12 divided in the longitudinal direction, wherein a sealing device 32 in accordance with the first embodiment of the invention is provided.

In FIG. 3, the two housing halves 14, 16 are shown in greatly simplified form in the sectioned view. In this case, the two housing halves 14, 16 are connected sealingly to one another by means of a sealing device 32, which has at least one elastomer seal 60 or O-ring seal. In the example shown in FIG. 3, one of the housing halves 16 is provided with a seal seat 62 in the form of a depression, e.g. a stepped profile or a groove 15. The groove 15 can be designed as a free-formed groove, for example. The elastomer seal 60 is inserted into the seal seat 62. In the installed condition, the elastomer seal 60 rests sealingly against both housing halves 14, 16. Moreover, the housing contact surfaces make contact without the seal, as indicated in FIG. 3. As an option, it is also possible for both housing halves 14, 16 to have a seal seat 62, as indicated by a dash-dotted line in FIG. 3. It is possible, for example, for an elastomer seal 60 to be inserted into just one of the seal seats 62 or into both. If an elastomer seal 60 is inserted into just one seal seat 62 of housing half 16, as indicated by a dashed line in FIG. 3, the dimensions of the elastomer seal 60 are sufficient to ensure that it is accommodated sealingly by the other seal seat 62 of the other housing half 14 in the assembled condition of the housing halves 14, 16. When there is an elastomer seal in each of the two seal seats 62 of the two housing halves 14, 16, the two elastomer seals 60 rest sealingly against one another and against the housing halves 14, 16 (not shown). As an option, the respective elastomer seal can additionally be fastened in the seal seat 62, e.g. by means of an adhesive, wherein the adhesive is preferably temperature-stable.

Figure 4:
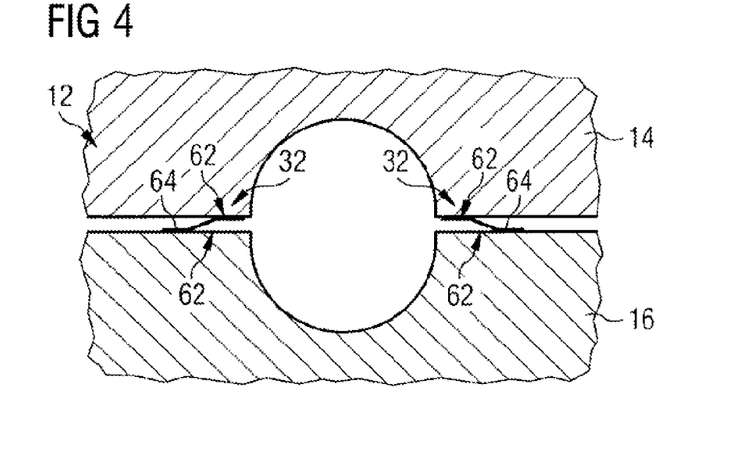
FIG. 4 shows a second embodiment according to the invention of a sealing device for a turbocharger housing.

FIG. 4 shows a second embodiment according to the invention of a sealing device 32 for a turbocharger housing 12. The second embodiment according to the invention is directed to a sealing device 32 which has at least one beaded seal 64, e.g. a metal beaded seal. In this case, the two housing halves 14, 16 of the longitudinally divided turbocharger housing 12 as shown in FIG. 4 have a flat or level or planar seal seat 62. In this case, the surface of the two housing halves 14, 16 in each case serves as a seal seat 62. The beaded seal 64 or metal beaded seal is placed between the two surfaces or surface sections of the housing halves 14, 16 which form the seal seat 62. The housing halves 14, 16 are then fastened sealingly to one another by means of the beaded seal 64, as indicated in FIG. 4. A beaded seal 64 made of metal has the advantage that it can be used both for relatively cool areas and for areas subject to high thermal stresses. At the same time, the entire internal contour of the metal beaded seal 64 can be produced in a stamping process, for example, and there are no locations which are not covered. Moreover, the beaded seal 64 can be brought very close to the surface edge to be sealed, e.g. by means of pinning and/or screwing etc., in order to minimize "transfer channels" formed by the seal. As an option, it is additionally possible to provide a flexible and/or temperature-stable material (not shown) on at least one or more sections or along the entire metal beaded seal 64, e.g. a rubber material, such as hard rubber, an elastomer etc. By this means, the sealing effect of the beaded seal 64 can be further improved, particularly in problematic sections. The beaded seal can have any desired shape and/or cross section, e.g. it can be stepped, as indicated in FIG. 4. The shape and/or the cross section of the beaded seal can be constant or uniform or variable over the length of the beaded seal, depending on function and application.

Figure 5:
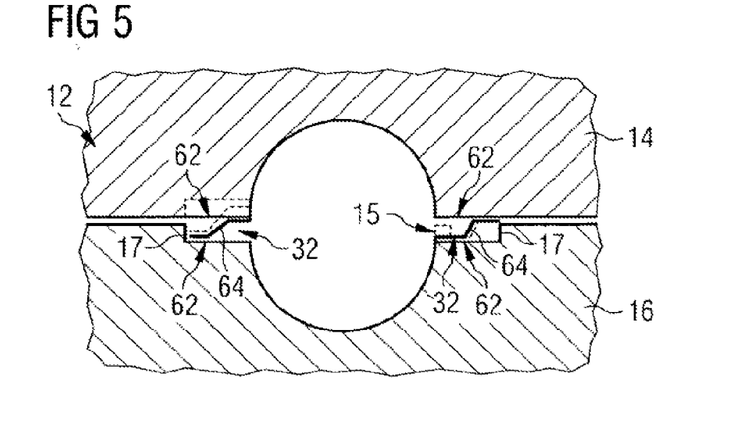
FIG. 5 shows a third embodiment according to the invention of a sealing device for a turbocharger housing.

FIG. 5 furthermore shows a third embodiment according to the invention of a sealing device 32 for a turbocharger housing 12. The third embodiment according to the invention differs from the second embodiment according to the invention in that the sealing device 32 has a seal seat 62 in the form of a depression, e.g. a groove 15 or a step 17 or stepped profile. In this case, a seal seat 62 in the form of a depression, e.g. a step 17, can be provided in one or both housing halves 14, 16, as indicated by a dotted line in FIG. 5.

The seal seat 62 can also be in the form of a groove 15, as indicated by a dash-dotted line in the lower housing half 16, for example. Here, the beaded seal 64 rests sealingly against both housing halves 14, 16 when the housing halves 14, 16 are assembled. If two seal seats 62 are provided, as indicated by a dotted line in FIG. 5, the beaded seal 64 is designed in such a way that it rests sealingly in both seal seats 62 or against both housing halves 14, 16. For this purpose, in the example shown in FIG. 5, the beaded seal 64 extends into the second seal seat 62 of the upper housing half 14, as indicated by a dashed line in FIG. 5, and rests sealingly against both housing halves 14, 16. In principle, a seal seat 62 can be provided in the form of a depression, e.g. a groove 15 or a stepped profile 17, in one or both housing halves 14, 16 and on one or both sides of the housing halves 14, 16, for example. This applies to all the embodiments of the invention.

Figure 6A:
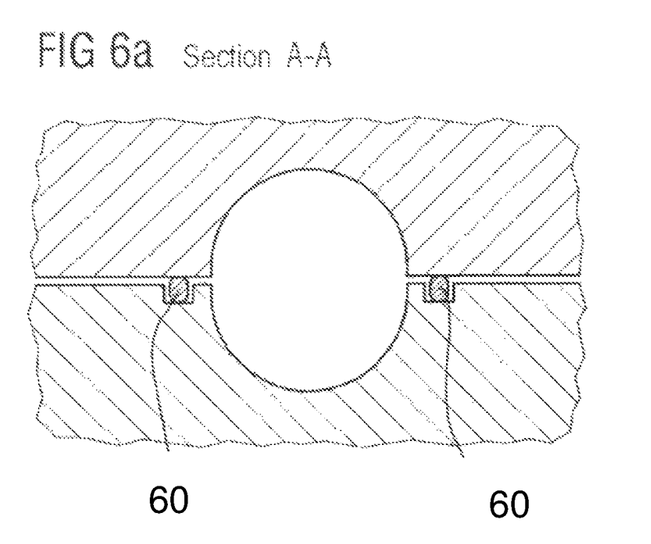
FIGS. 6a, b, c show a fourth embodiment according to the invention of a sealing device for a turbocharger housing.
Figure 6B:
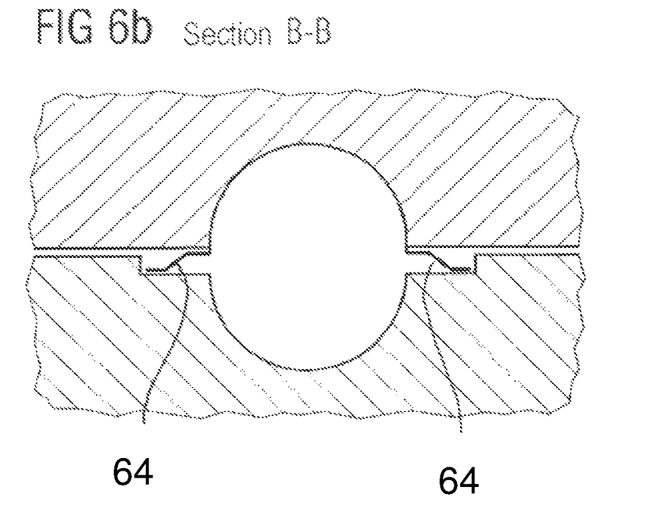
Figure 6C:
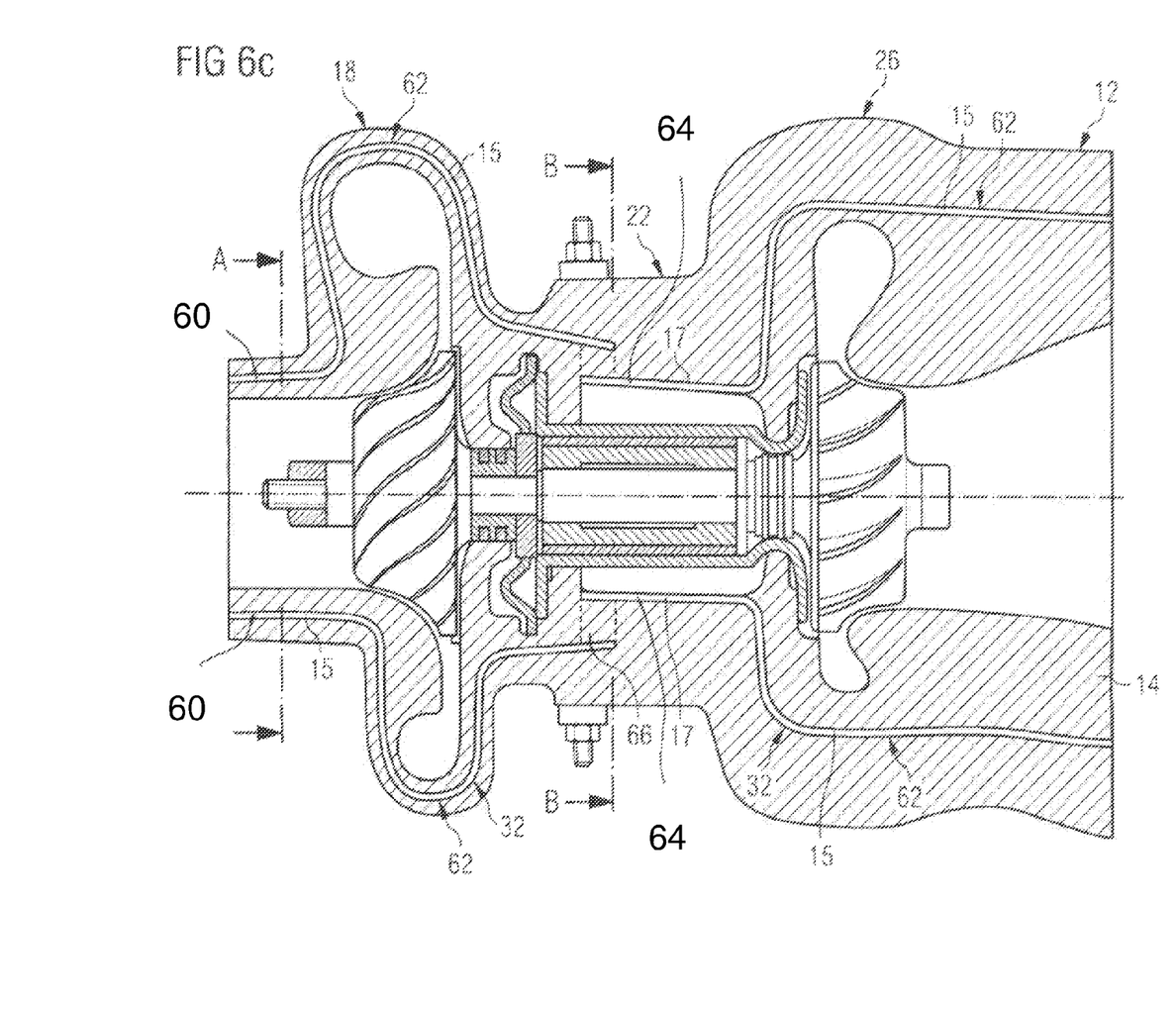

FIGS. 6a, 6b and 6c furthermore show a fourth embodiment according to the invention of a sealing device 32 for a turbocharger housing 12, wherein FIGS. 6a and 6b show various sectioned views A-A and B-B through the turbocharger housing 12 according to FIG. 6c. The turbocharger housing 12 in FIG. 6c corresponds essentially to the turbocharger housing 12 shown in FIGS. 1 and 2 but does not have a fluid jacket. Moreover, the holes for connecting housing half 14 of the turbocharger housing 12 to the other housing half have not been shown for reasons of clarity. Moreover, the turbocharger housing 12 shown in FIG. 6c has two seal seats 62 on each side of housing half 14.

By way of example, FIG. 6a shows a section A-A through the compressor housing section 18 of the turbocharger housing 12 shown in FIG. 6c, which is divided in the longitudinal direction into two housing halves 14, 16. FIG. 6b, in turn, shows a section B-B through the bearing housing section 22 of the turbocharger housing 12 shown in FIG. 6c. The sectioned views in FIGS. 6a and 6b are greatly simplified and purely schematic and show only the turbocharger housing 12 but not details such as the rotor assembly, the shaft etc.

In this case, the sealing device 32, which is provided for the purpose of sealing the two housing halves 14, 16, has at least two seals for example, e.g. two different seals, as shown in FIGS. 6a and 6b. In the example shown in FIGS. 6a and 6b, the sealing device 32 has a beaded seal 64, e.g. a metal beaded seal, and an elastomer seal 60 or O-ring seal. Here, the beaded seal 64 is arranged in a warmer area of the turbocharger housing 12, for example, e.g. in the area of the turbine housing 26 and/or bearing housing 22, as shown in FIGS. 6a and 6c, whereas the elastomer seal 60 is arranged in a cooler area of the turbocharger housing 12, for example, e.g. the compressor housing 18, as shown in FIGS. 6b and 6c. In other words, the turbocharger housing 12 can be provided with a sealing device 32 which provides different seals for different housing sections, and thus a metal beaded seal 64 is provided for the thermally stressed turbine housing and, as an option, additionally for the bearing housing or a section of the bearing housing, and an elastomer seal 60 or O-ring seal is provided for the compressor housing, which is subject to less thermal stress.

In FIG. 6c, the housing half 14 of the longitudinally divided turbocharger housing 12 is shown from the seal side in a greatly simplified view. In this case, housing half 14 has the two seal seats 62 of the sealing device 32 for the elastomer seal 60 and the beaded seal 64 shown in FIGS. 6a and 6b. In this case, the seal seat 62 for the beaded seal can be in the form of a stepped profile 17 in the area of the bearing housing 22, as shown in FIG. 6a, and can furthermore merge into a groove 15 in the area of the turbine housing 26 or can be designed as a groove there, as indicated in FIG. 6c. Moreover, the seal seat 62 for the elastomer seal 60 can be designed as a groove 15 and can at least partially overlap the other seal seat 62 for the beaded seal, as shown in FIG. 6c, or can end at or before the latter (not shown). As shown in FIG. 6c, the two seals 60, 64 and the seal seats 62 overlap or intersect one another in an area 66.

Although the present invention has been described with reference to preferred embodiments, it is not restricted thereto but can be modified in many different ways.

The abovementioned embodiments and, in particular, individual features thereof can be combined.

A beaded seal, e.g. one made of metal, can be used both for cooler areas and for areas subject to high thermal stresses. As described above, the entire internal contour of the beaded seal can be formed by a stamping process, for example, and there are no locations which are not covered. Another advantage of the beaded seal is that it can be brought very close to the surface edge to be sealed, e.g. by means of pinning, in order to minimize transfer channels formed by the seal. At the same time, an additional rubber rim made, for example, of a heat-resistant material such as hard rubber, can be provided on the beaded seal, at least in a problematic section of the turbocharger housing. In the case of a beaded seal in a groove as a seal seat, the housing halves may be in direct contact. This eliminates seal tolerances, which may give rise to an additional eccentricity in the production of a round hollow-turned feature. Moreover, there is no need for locating pins for positioning; instead, the recess can be used as a position stop.

An elastomer seal or O-ring seal has the advantage that it can be placed in a groove which is, for example, free-formed as a seal seat, which does not necessarily have to be closed. Thus, it is also possible to allow the seal material to protrude slightly to enable it, for example, to rest against a piston ring. In addition, it is thereby possible to achieve a greater sealing effect.

The combination of an O-ring seal or elastomer seal and a beaded seal has the advantage that, on the one hand, it once again allows direct contact between the housing halves and protrusion for a better sealing effect.

As described above, it is furthermore possible for the respective seal, e.g. beaded seal or elastomer seal or O-ring seal, to be of uniform design throughout or to vary in shape or cross section. In corresponding fashion, it is also possible for the seal seat for the seal, i.e. the beaded seal or elastomer seal, to remain constant in shape or cross section throughout, e.g. to be designed as a groove or step, or to vary and, for example, to make a transition from a step or level surface into a groove, as shown in the example in FIG. 6c. This applies to all the embodiments of the invention.

Moreover, the invention is not restricted to seals such as the beaded seal, the elastomer seal or O-ring seal. In principle, any other seal or combination of seals which is suitable for connecting the two housing halves of the turbocharger housing sealingly to one another or for sealing the two housing halves with respect to one another can be used. The sealing device or seal or seals thereof according to the invention are designed in such a way that they prevent unwanted escape of gas such as exhaust gas from the turbine or air from the compressor, and/or liquid such as lubricant or water, between the housing halves of the turbocharger housing.

The invention claimed is:

1. A turbocharger housing assembly, comprising:
a turbocharger housing having two housing halves dividing the turbocharger housing in a longitudinal direction thereof, each of said two housing halves including one half of a compressor housing, one half of a bearing housing, and one half of a turbine housing; and
a sealing device between said two housing halves for sealingly connecting said two housing halves to one another;
said sealing device including a first seal and a second seal being a different type of seal than said first seal;
said first seal extending in the longitudinal direction of said turbocharger housing along a first housing section including said turbine housing and said bearing housing of said turbocharger housing; and
said second seal extending in the longitudinal direction of said turbocharger housing along a second housing section including said compressor housing and at least a part of said bearing housing;
wherein said first and second seals overlap or intersect only partially in only one area.

2. The turbocharger housing assembly according to claim 1, wherein said sealing device between said two housing halves comprises one or more seals selected from the group consisting of at least one beaded seal, an O-ring seal, and an elastomer seal.

3. The turbocharger housing assembly according to claim 2, wherein said sealing device is fastened in a seal seat.

4. The turbocharger housing assembly according to claim 2, wherein said one or more seals includes a flexible material that is a hard rubber, an elastomer, or a polymer.

5. The turbocharger housing assembly according to claim 1, wherein said sealing device has a seal seat formed of a level surface or a level surface section, wherein said seal seat is provided on one or both sides of at least one said two housing halves to receive at least one seal of said sealing device.

6. The turbocharger housing assembly according to claim 5, wherein a shape or cross section and/or dimensioning of said seal seat and/or of said seal is constant.

7. The turbocharger housing assembly according to claim 1, wherein said sealing device has a seal seat formed of a depression, and said seal seat is formed on one or both sides of at least one of said two housing halves for receiving at least one seal of said sealing device.

8. The turbocharger housing assembly according to claim 7, wherein said depression of said seal seat is one of a groove or a stepped profile.

9. The turbocharger housing assembly according to claim 7, wherein said seal seat is molded or free formed in one of said two housing halves in the form of a depression, or is milled in one of said two housing halves by a milling cutter.

10. The turbocharger housing assembly according to claim 7, wherein said seal seat is molded or free formed in said one or both sides of said at least one of said two housing halves in the form of a depression being a groove and/or a stepped profile.

11. The turbocharger housing assembly according to claim 1, wherein:
said first seal is a beaded seal; and
said second seal is an elastomer seal.

12. The turbocharger housing assembly according to claim 1, wherein said first seal and said second seal each contact both of said two housing halves.

* * * * *